United States Patent [19]

Stürwald

[11] Patent Number: 4,947,634
[45] Date of Patent: Aug. 14, 1990

[54] RING SPINNING OR RING TWISTING MACHINE

[75] Inventor: Wilhelm Stürwald, Stuttgart, Fed. Rep. of Germany

[73] Assignee: SKF Textilmaschinen-Komponenten GmbH, Fed. Rep. of Germany

[21] Appl. No.: 356,685

[22] Filed: May 25, 1989

[30] Foreign Application Priority Data

Jul. 2, 1988 [DE] Fed. Rep. of Germany ....... 3822420

[51] Int. Cl.$^5$ ..................... D01H 1/244; D01H 1/26
[52] U.S. Cl. ................................. 57/93; 57/97; 57/100
[58] Field of Search .................. 57/75, 92–94, 57/100, 101, 96, 97

[56] References Cited

U.S. PATENT DOCUMENTS

| | | | |
|---|---|---|---|
| 3,738,095 | 6/1973 | Lohest | 57/100 |
| 4,161,862 | 7/1979 | Hartmannsgruber et al. | 57/100 X |
| 4,254,615 | 3/1981 | Adolf et al. | 57/93 X |
| 4,314,388 | 2/1982 | Hartmannsgruber et al. | 57/92 X |
| 4,336,684 | 6/1982 | Hartmannsgruber et al. | 57/93 |
| 4,646,391 | 3/1987 | Wolf | 57/100 X |

FOREIGN PATENT DOCUMENTS 2235686 1/1974 Fed. Rep. of Germany .
2911378 10/1980 Fed. Rep. of Germany .

OTHER PUBLICATIONS

"Reluctanzmotoren" in Feinwerktechnik, Rororo Techniklexikon, Deutscher Verlag–Nstalt GmbH, Stuttgart, FRG, 1968, Bank 5, p. 870.

Primary Examiner—John Petrakes
Attorney, Agent, or Firm—Wigman & Cohen

[57] ABSTRACT

In a ring spinning or ring twisting machine the spindles of which each have an asynchronous motor as drive means, and the auxiliary apparatus thereof are driven by at least one electric motor having variable rotational speed, and the ratio of the rotational speeds of the electric motor driving the auxiliary apparatus and the asynchronous motors remains constant, a reluctance motor is used to drive the auxiliary apparatus. Two converters are used which are controlled in such a manner that the speed ratio remains constant.

6 Claims, 1 Drawing Sheet

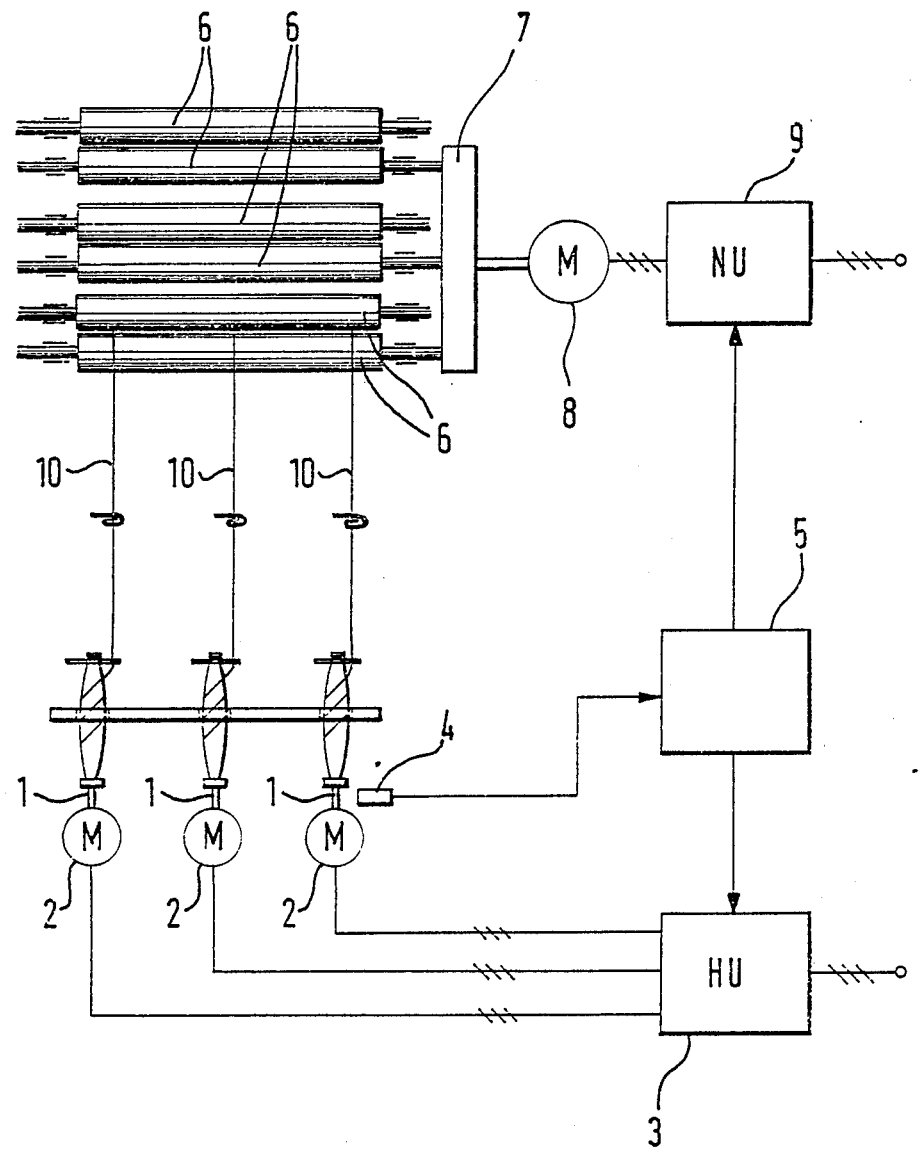

RING SPINNING OR RING TWISTING MACHINE

BACKGROUND OF THE INVENTION

The invention relates to a ring spinning or ring twisting machine, each of the spindles of which has an asynchronous motor for drive purposes and having auxiliary apparatus that are driven by at least one electric motor with a variable rotational speed, whereby the asynchronous motors which individually drive the spindles are connected to a primary converter and the electric motor driving the auxiliary apparatus is connected to an auxiliary converter; a control device is provided that controls both converters such that the ratio of the rotational speeds of the electric motor driving the auxiliary apparatus and the asynchronous motors remains constant.

With machines of this type it has proven necessary to drive the auxiliary apparatus, which in a ring spinning machine is the drawing equipment, by means of a synchronous motor, in order to retain the ratio of the rotational speeds of the auxiliary apparatus and the spindles constant, both during operation and during the start up and shut down procedures. This is a prerequisite for a uniform yarn quality. The primary disadvantage thereby is that during both start up and shut down procedures, care must be taken that the synchronous motor does not get out of step, and that if it does get out of step special measures must be taken in order to bring it back into synchronization.

OBJECTS AND SUMMARY OF THE INVENTION

The object of the invention, therefore, is to create a ring spinning or ring twisting machine which, with a minimum expense, can reliably operate at the ratio of rotational speeds of the auxiliary apparatus and the spindles necessary for a uniform yarn quality, not only during operation, but also during the start up and shut down procedures. This object is achieved by a ring spinning or twisting machine having a plurality of spindles, and a plurality of asynchronous motors, each of the spindles being driven by an individual respective asynchronous motor, and one or more auxiliary apparatus driven by at least one variable speed auxiliary electric drive motor, which may be a reluctance motor, a primary voltage converter for producing a first drive voltage having a variable characteristic such as voltage or frequency for driving the asynchronous spindle motors, a second voltage converter for producing a second drive voltage having a variable characteristic such as voltage or frequency for driving the variable speed auxiliary drive motor(s), and a control apparatus for controlling the first converter and the second converter such that the ratio of the rotational speeds of the motors remains constant.

A reluctance motor is not materially more expensive than an inexpensive asynchronous motor, yet reluctance motors have the decided advantage over an asynchronous motor that its rotational speed can easily be kept at a set point value. This is because, if a slippage should occur, it develops an asynchronous torque that allows it to be brought so near to the synchronous rotational speed during start up or when it slips out of step, that it automatically returns to synchronization. Both during operation and during the start up and shut down procedures, the primary converter and the auxiliary converter need only be set at the output frequency that yields the necessary rotational speed ratio. The expense for setting the rotational speed and the maintenance of a given rotational speed ratio is therefore equally low as the known machines that use a synchronous motor to drive the auxiliary apparatus.

The control device which determines the desired output frequency of the converters is preferably a part of a regulating circuit that allows the rotational speed of the asynchronous motors to be held at the predetermined set point value. The slippage can preferably by this means be held to a uniform percentage at all rotational speeds with the aid of the original voltage.

BRIEF DESCRIPTION OF THE DRAWING

The invention is described in greater detail below through the use of a preferred example, which embodiment is illustrated in the single FIGURE, which shows in schematic illustration the elements of a ring spinning machine essential to understand the invention.

DETAILED DESCRIPTION OF A PREFERRED EMBODIMENT

In a ring spinning machine a plurality of vertical spindles 1 are arranged in one or more rows, spaced adjacent to one another. The lower end section of each spindle 1 forms the motor shaft of an asynchronous motor 2. All of these asynchronous motors 2 are connected to a primary converter 3, the output frequency and original voltage of which are variable.

At least one of the spindles 1 is associated with a rotational speed sensor 4 which delivers the rotational speed actual value to a control device 5. The control device 5 in turn, controls the output frequency and also the output voltage of the primary converter 3 in dependence on predeterminable set point values.

A drawing frame is arranged as an auxiliary apparatus above the spindles 1 in the known manner, illustrated by the drawing rollers 6. All of the drawing rollers 6 are driven by a reluctance motor 8 by means of a distribution transmission 7; the motor 8 is connected to an auxiliary converter 9. The auxiliary converter 9 is also controlled with regard to its output frequency and output voltage by the control device 5.

During the start up of the machine, the output voltage and the output frequencies of the two converters 3 and 9 are gradually increased in accordance with a program that guides the control device 5, until the asynchronous motors 2 and the reluctance motor 8 have reached their operational rotational speeds. Accordingly, during the entire start up procedure, the ratio of the rotational speed of the asynchronous motors 2 and the reluctance motor 8 is held constant. This is easily accomplished because the reluctance motor 8 automatically falls into synchronism at the beginning of the start up procedure and remains there, and the slippage of the asynchronous motors 2 can easily be held to a uniform percentage value. Correspondingly, during a shut down procedure the output frequencies and output voltages of the converters 3 and 9 are reduced by the control device 5 in a predetermined manner such that the ratio of the rotational speeds of the asynchronous motors 2 and the reluctance motor 8 remains constant. All yarns 10 therefore experience the same rotation during the start up and shut down procedures as during operation at normal operational rotational speeds, so that the yarn quality remains constant.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A ring spinning machine comprising:
   a plurality of spindles;
   a plurality of asynchronous motors, each of said spindles being driven by a respective one of said asynchronous motors;
   at least one auxiliary apparatus;
   at least one reluctance motor, adapted for driving said at least one auxiliary apparatus;
   means for producing a first drive voltage having a variable characteristic;
   means for producing an auxiliary drive voltage having a variable characteristic;
   means for connecting said first voltage to said asynchronous spindle drive motors;
   means for connecting said auxiliary drive voltage to said at least one reluctance motor; and
   means for controlling the means for producing a first drive voltage and the means for producing an auxiliary drive voltage such that the ratio of the rotational speeds of the reluctance motor and the asynchronous motors remains constant.

2. The ring spinning machine of claim 1, further including means for regulating the slippage of the asynchronous motors, wherein said control means forms a portion of said means for regulating.

3. The ring spinning machine of claim 1, further including means for regulating the slippage of the asynchronous motors, wherein said means for controlling forms a portion of said means for regulating and the slippage of the asynchronous motors is held to a constant percentage value at all rotational speeds.

4. A ring twisting machine comprising:
   a plurality of spindles;
   a plurality of asynchronous motors, each of said spindles being driven by a respective one of said asynchronous motors;
   at least one auxiliary apparatus;
   at least one reluctance motor, adapted for driving said at least one auxiliary apparatus;
   means for producing a first drive voltage having a variable characteristic;
   means for producing a an auxiliary drive voltage having a variable characteristic;
   means for connecting said first voltage to said asynchronous spindle drive motors;
   means for connecting said auxiliary drive voltage to said at least one reluctance motor; and
   means for controlling the means for producing a first drive voltage and the means for producing an auxiliary drive voltage such that the ratio of the rotational speeds of the reluctance motor and the asynchronous motors remains constant.

5. The ring twisting machine of claim 4, further including means for regulating the slippage of the asynchronous motors, wherein said control means forms a portion of said means for regulating.

6. The ring twisting machine of claim 4, further including means for regulating the slippage of the asynchronous motors, wherein said means for controlling forms a portion of said means for regulating and the slippage of the asynchronous motors is held to a constant percentage value at all rotational speeds.

* * * * *